Oct. 16, 1923.  
V. R. WILL  
1,471,016

SAFETY DEVICE FOR AUTOMOBILES

Filed March 28, 1922

INVENTOR.  
Victor R. Will  
BY  
ATTORNEY

Patented Oct. 16, 1923.

1,471,016

UNITED STATES PATENT OFFICE.

VICTOR R. WILL, OF LODI, CALIFORNIA.

SAFETY DEVICE FOR AUTOMOBILES.

Application filed March 28, 1922. Serial No. 547,378.

*To all whom it may concern:*

Be it known that I, VICTOR R. WILL, a citizen of the United States, residing at Lodi, county of San Joaquin, State of California, have invented certain new and useful Improvements in Safety Devices for Automobiles; and I do declare the following to be a full, clear, and exact description of the same, reference being had to the accompanying drawings, and to the characters of reference marked thereon, which form a part of this application.

This invention relates to improvements in safety devices for automobiles, the principal object being to provide a device in the form of an attachment, to be secured onto the front axle of an automobile or motor vehicle of any character and which will prevent further damage to the car, or possible injury to the occupants, in the not infrequent event of the front spindle on either side breaking, thus causing a front wheel to be detached from the car, resulting in the dropping down of the front end of the car on that side.

As conditions now are, when this happens, the axle fork or yoke contacts with the ground or roadway, and biting into the same, very often causes the car to up-end and turn over, with at least serious injury if not death to the occupants in many cases.

With my improved attachment, which is permanent, and needs no manipulation of any kind on the part of the driver to place it into operative position, such fatal or serious consequences of an accident to the spindle are obviated, and if necessary the vehicle may be run to the nearest repair station under its own power, and without the need of a dolly truck.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
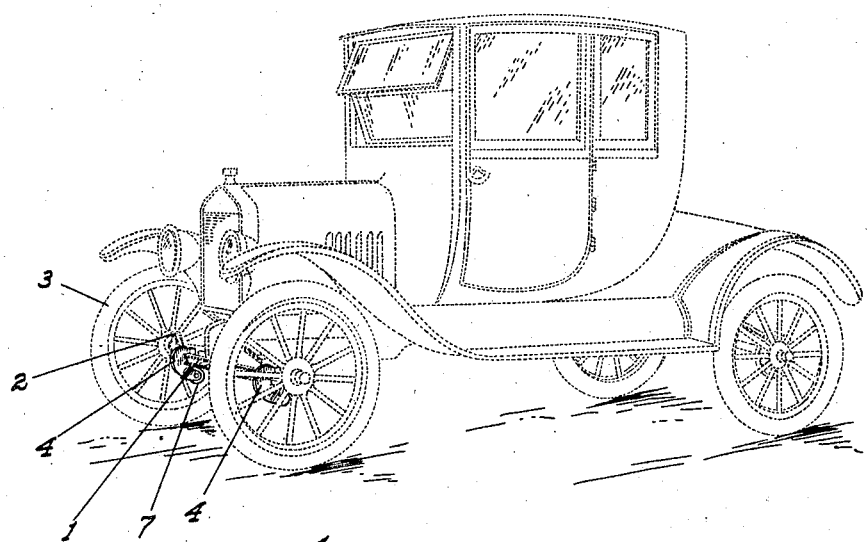
Fig. 1 is a perspective view of a motor car, showing the application of my safety device thereto.
Figure 2:
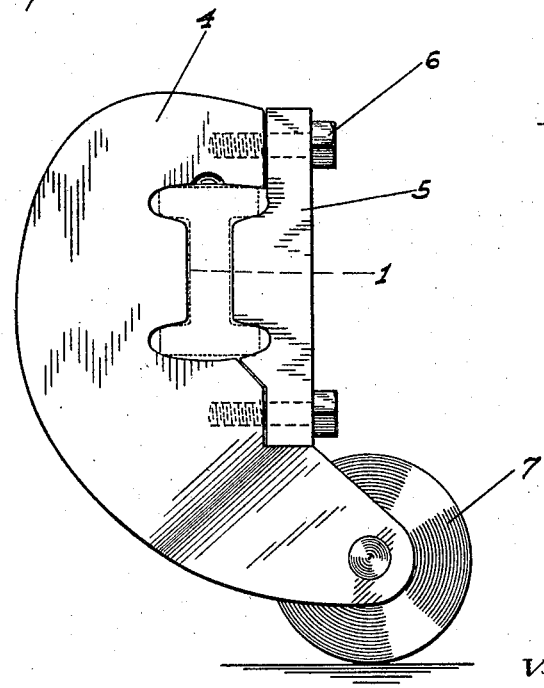
Fig. 2 is an enlarged detached view of one of the safety members.

Referring now more particularly to the characters of reference on the drawings, the numeral 1 denotes the front axle of the vehicle having the usual spindle-holding forks 2 at the ends thereof, in which forks are swivelly mounted on the spindles of the front wheels 3, as in standard construction. When such a spindle breaks, releasing the corresponding wheel, the axle at one end drops to the ground, and the fork on that side contacting with and digging into the roadway, brings the vehicle to a sudden halt, tending to up-end the vehicle.

It is to obviate such disasters that my improved safety device is intended, and this consists of a pair of substantial and rigid arms 4, adapted to embrace the axle adjacent the forks and to be clamped against movement of any kind relative thereto by means of removable clamping bars 5 said arms and clamps being so designed and shaped with respect to the cross-sectional contour of the axle that no strain is ever thrown onto the relatively light bolts or cap screws 6 by which the bars 5 are attached to the arms 4.

The latter depend sufficiently below the axle so that they would contact with the ground before the axle-forks or any members projecting therefrom; they also project rearwardly below the axle, so as to form skids which, when contacted with the ground, will not tend to dig into the same and too suddenly reduce the momentum of the vehicle.

In order to reduce the frictional resistance of the skids or arms with the ground, rollers or small wheels 7 are mounted at the lower ends of the said arms, which of course contact with the ground in the event of the breaking of a spindle, before any other part.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A safety device for motor vehicles comprising a pair of arms adapted to be mounted onto the front axle and depending therebelow and to the rear thereof, and rollers mounted at the lower ends of the arms.

In testimony whereof I affix my signature.

VICTOR R. WILL.